United States Patent Office 3,394,122
Patented July 23, 1968

3,394,122
MONOAZO TRIAZINE DYESTUFFS
Karl Seitz, Neu-Allschwil, Switzerland, assignor to Ciba Limited, Basel, Switzerland, a company of Switzerland
No Drawing. Filed Aug. 17, 1965, Ser. No. 480,495
Claims priority, application Switzerland, Aug. 27, 1964, 11,254/64; July 21, 1965, 10,202/65
4 Claims. (Cl. 260—153)

ABSTRACT OF THE DISCLOSURE

Azo dyestuffs which, in the form of free acids, correspond to the formula

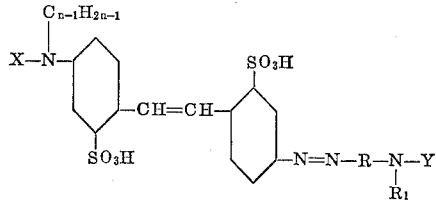

in which $n$ represents a positive integer not greater than 6, but preferably represents 1, R represents a benzene or naphthalene residue bound in 1,4-position, $R_1$ represents a hydrogen atom or an alkyl group that may be substituted and X and Y each represent a fibre-reactive substituent are particularly suited for the dyeing of polyhydroxlyated fibrous materials.

---

The present invention provides new, valuable azo dyestuffs which, in the form of free acids, correspond to the formula (1)

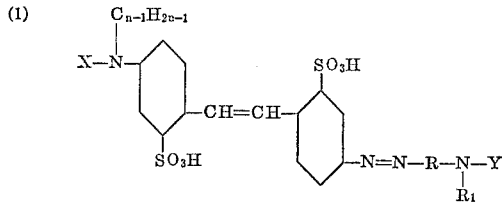

in which $n$ represents a positive integer not greater than 6, but preferably represents 1, R represents a benzene or naphthalene residue bound in 1,4-position, $R_1$ represents a hydrogen atom or an alkyl group that may be substituted and X and Y each represent a fibre-reactive substituent.

The term "fibre-reactive substituents" refers to reactive groupings, preferably heterocyclic groupings, that are capable of reacting with the hydroxyl groups of cellulose or the carbamide groups of polyamides with formation of a covalent bond.

If one of the fibre-reactive substituents does not contain acidic groups imparting solubility in water, at least one, but preferably two such groups must be present in the other reactive residue. Advantageously, both fibre-reactive residues contain at least one group imparting solubility in water.

Dyestuffs of the present invention that are of special interest are those containing at least four acidic groups imparting solubility in water, for example, sulphonic, carboxylic or sulphato groups, and which contain diazines or triazines as fibre-reactive substituents, especially the grouping of the formula

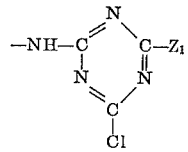

in which $Z_1$ represents the residue of an aliphatic, but preferably aromatic, amine that contains a group imparting solubility in water, and fibre-reactive groups of the kind in which the eliminable substituent is a quaternary ammonium or hydrazinium group, in particular, one bound to a carbon atom of a heterocyclic residue, that is to say, for example, a group of the formula

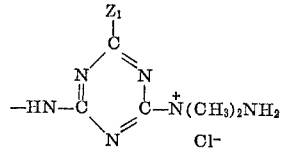

or

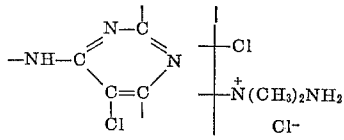

in which $Z_1$ has the meaning given above.

The dyestuffs of the invention may be prepared by condensing dyestuffs of the formula (2)

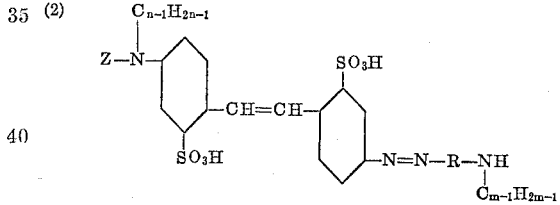

in which $m$ and $n$ each represent a positive integer not greater than 6, but preferably stand for 1, R represents a benzene or naphthalene residue bound in 1,4-position and Z represents a hydrogen atom or a fibre-reactive substituent, with organic compounds containing exchangeable halogen atoms or groupings, which organic compounds react with primary or secondary amino groups with formation of a fibre-reactive grouping.

Compounds of the kind defined are, for example, the anhydrides or chlorides of chloromaleic acid, propiolic acid, chlorocrotonic acid, β-chloro- or α,β-dibromo-propionic acid, acrylic acid, chloro-acrylic acid and so forth, but especially the following heterocyclic compounds:

2-halogen-benzthiazole- or oxazole-carboxylic or sulphonic acid chloride,
4,5-dichloropyridazone-[6]-propionic acid chloride,
4,5-dichloro-1-phenylpyridazone-carboxylic or sulphonic acid chloride,
1,4-dichlorophthalazine carboxylic or sulphonic acid chloride,
2,3-dichloroquinoxaline carboxylic or sulphonic acid chloride, 2,4-dichloroquinazoline carboxylic or sulphonic acid chloride,
tetrachloropyridazine,
2,4,6-tri- or 2,4,5,6-tetra-chloropyrimidine,
2,4-dichloropyrimidine-5-sulphonic acid,
5-nitro- or 5-cyano-2,4,6-trichloropyrimidine,
5-nitro-6-methyl-2,4-dichloropyrimidine,
2,6-dichloropyrimidine-4- or 5-carboxylic acid chloride,
2,4-dichloropyrimidine-5-sulphonic acid chloride,
2,4,6-trichloro-1,3,5-triazine, and
4,6-dichloro-1,3,5-triazines that are substituted in 2-position by an aryl or alkyl residue, for example, a phenyl residue, a methyl residue or an ethyl residue or by the residue of an aliphatic or aromatic mercapto compound bound by its sulphur atom or the residue of an aliphatic or aromatic hydroxyl compound bound by its oxygen atom, or especially by a —$NH_2$ group or by the residue of an aliphatic, heterocyclic or aromatic amino compound bound by its nitrogen atom.

As compounds of the kind defined whose residues may be bound to a triazine nucleus in 2-position by reaction with trihalogen-triazine there may be mentioned, for example, aliphatic or aromatic mercapto or hydroxyl compounds, for example, thioalcohols, thioglycolic acid, thiourea, thiophenols, methyl alcohol, ethyl alcohol and isopropyl alcohol, glycolic acid, phenol, chlorophenols or nitrophenols, phenolcarboxylic acid, phenolsulphonic acid, naphthols, naphtholsulphonic acid, and so forth, but especially ammonia and compounds containing acylatable amino groups, for example, hydroxylamine, hydrazine, phenylhydrazine, phenylhydrazine sulphonic acids, carbamic acid and the derivatives thereof, semicarbazides, thiosemicarbazides, semicarbazones and thiosemicarbazones, methylamine, ethylamine, isopropylamine, methoxyethylamine, methoxypropylamine, dimethylamine, diethylamine, methylphenylamine, ethylphenylamine, chlorethylamine, ethanolamines, propanolamines, benzylamine, cyclohexylamine, morpholine, piperidine, piperazine, aminocarbonic acid esters, aminoacetic acid ethyl esters, aromatic amines, for example, aniline, N-methylaniline, toluidines, xylidines, chloranilines, para- and meta-acetanilide, nitranilines, aminophenols, nitrotoluidines, phenylenediamines, toluylenediamines, anisidine, phenetidine, diphenylamine, naphthylamines, aminonaphthylamines, aminonaphthols, diaminonaphthalenes and especially amines containing acidic groups, for example, β-sulphatoethylamine, aminoethanesulphonic acid, N - methylaminoethanesulphonic acid, sulphanilic acid, metanilic acid, orthanilic acid, anilinedisulphonic acids, aminobenzoic acids, naphthyl-'aminomono-, di- and tri-sulphonic acids, aminobenzoicsulphonic acids, 1-hydroxy-5-aminobenzoic acid, aminonaphthalenemono-, di- and tri-sulphonic acids and so forth, as well as coloured compounds and compounds having dyestuff character, for example, 4-nitro-4'-aminostilbene disulphonic acid, 2-nitro-4'-aminodiphenylamine-4,3'-disulphonic acid and especially aminoazo dyestuffs or aminoanthraquinones or phthalocyanines that still contain at least one reactive amino group, for example, compounds of the formula

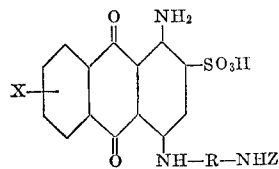

or

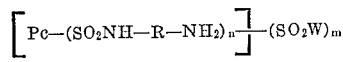

in which X represents a hydrogen atom, a halogen atom or a sulphonic acid group, R represents an ethyl residue, a phenyl residue or a diphenyl residue that may be substituted, Z represents a hydrogen atom or an alkyl residue, Pc represents a phthalocyanine residue, W represents an —OH or —$NH_2$ group and $n$ and $m$ represent 1, 2 or 3.

The introduction of the triazine ring substituted in 2-position by the residue of a hydroxyl, mercapto or amino compound is advantageously effected by first reacting an azo dyestuff, prepared by coupling, with a 2,4,6-trihalogen-1,3,5-triazine, especially cyanuric chloride, and subsequently replacing a halogen atom in the dihalogen-triazine residue or residues obtained by reaction with one or a number of the above-mentioned compounds.

The starting dyestuffs of the Formula 2 may be prepared by coupling diazo compounds obtained from amines of the formula

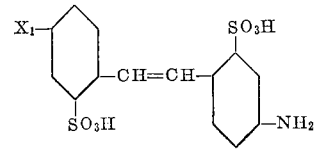

in which $X_1$ represents a nitro group, an acylamino group or a residue of the formula

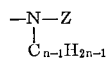

in which Z and $n$ have the meanings ascribed to them in Formula 2, with amines of the benzene or α-naphthalene series which couple in para-position and which correspond to the formula

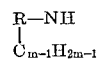

in which R and $m$ have the meanings ascribed to them in Formula 2 and, when $X_1$ represents a nitro group or an acylamino group, the said group in the dyestuff obtained is subsequently reduced or hydrolysed.

Amines of the kind defined that may be mentioned are: aniline, N-methylaniline, N-ethylaniline, N,β-hydroxyethylaniline, xylidine, meta-toluidine, N-methyl-metatoluidine, ortho-anisidine, cresidine, 2,5-dimethoxyaniline, meta - acetylaminoaniline, meta - propionylaminoaniline, meta - methanesulphonylaminoaniline, meta-ureidoaniline and the like, α-naphthylamine, 6-, 7- and 8-sulpho-1-aminonaphthalene and the like.

The condensation process in accordance with the invention can be carried out in known manner, for example, in aqueous medium with the addition of an agent capable of binding acid, for example, sodium hydroxide or sodium carbonate. When Z in the starting dyestuffs represents a hydrogen atom, at least, 2 mols of the compound introducing the fibre-reactive substituent must, of course, be used per mol of dyestuff; when Z is already a fibre-reactive residue, the use of at least one mol of compound carrying the fibre-reactive residue is sufficient for the condensation, and the two fibre-reactive substituents X and Y in the final products may be identical or different. In any case, dyestuffs having chlorotriazine residues as reactive substituents are specially valuable, in particular, those having a sulphonic acid or carboxyl group in the triazine residue, preferably bound to an aromatic residue.

The exchangeable halogen atoms or fibre-reactive substituents present in the dyestuffs obtained by the process of the present invention may easily be replaced, for example, by reaction with ternary amines or hydrazines (for example, dimethylhydrazine), fibre-reactive dyestuffs being obtained in which the eliminable substituent is a quaternary ammonium or hydrazine group bound to a carbon atom, especially a carbon atom forming part of a heterocyclic residue, that is to say for example, a group of the formula

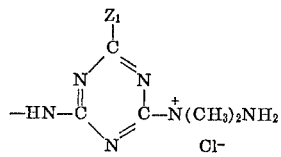

or

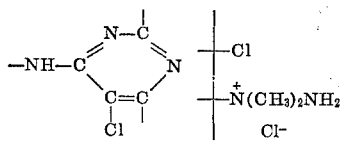

in which $Z_1$ has the meaning given above.

Of the dyestuffs obtained in this manner special mention must be made of two groups, namely those of the formula

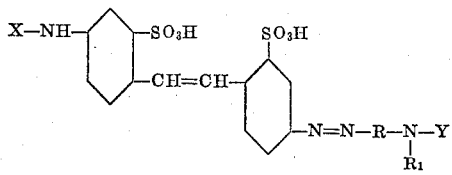

in which R represents a benzene residue free from sulphonic and carboxy groups and which is bound in 1,4-position, $R_1$ represents a low-molecular alkyl residue and X and Y each represent a 2-chloro-4-amino-1,3,5-triazine residue bound in 6-position, the 4-amino group in both residues being a derivative of an aromatic amine containing sulphonic acid groups, and those of the formula

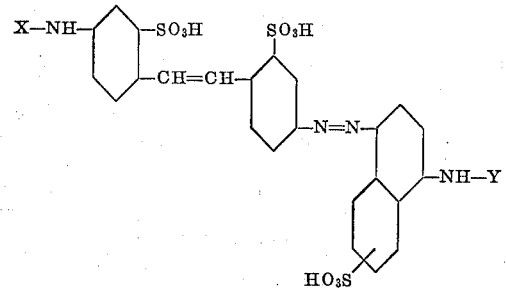

in which X and Y each represent a 2-chloro-4-amino-1,3,5-triazine residue bound to the —NH— bridging group in 6-position, the 4-amino group in at least one of the two residues being a derivative of an aromatic amine containing sulphonic acid groups.

The dyestuffs obtainable by the process of the invention are new. They are valuable dyestuffs suitable for dyeing and printing a very wide variety of materials, especially polyhydroxylated materials of fibrous structure, for example, materials containing cellulose. Such materials include man-made fibres, for example, fibres made from regenerated cellulose and also natural cellulosic materials, for example, pulp, linen and especially cotton. They are specially suitable for application by the so-called direct dyeing method at a high liquor-to-goods ratio in an aqueous, alkaline bath that may contain a high concentration of salt.

In order to improve the properties of wet fastness it is generally advantageous to subject the dyeings and prints so obtained to a thorough rinse with cold and hot water, if desired or required, in the presence of a substance that assists the dispersion and diffusion of unfixed dyestuff.

The dyestuffs of the invention are distinguished by a high degree of fixation and by the ease with which unfixed dyestuff can be washed out. The dyeings obtained therewith are distinguished by a very good fastness to washing and a good fastness to chlorine and to light.

The following examples illustrate the invention. Unless otherwise stated, the parts and percentages are by weight.

EXAMPLE 1

24.4 parts of the dyestuff of the formula

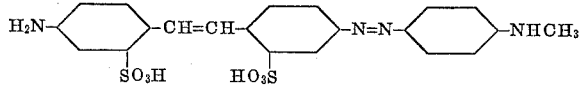

which can be prepared in known manner, for example, by coupling 4-nitro-4'-aminostilbene-2,2'-disulphonic acid with N-methylaniline and subsequent reduction of the nitro group to an amino group with the aid of sodium sulphide, are suspended in 500 parts of water and the suspension formed is neutralized by the addition of sodium hydroxide. A solution of the primary condensation product obtained from 25.3 parts of aniline-2,5-disulphonic acid and 18.5 parts of cyanuric chloride is added to the solution obtained and the whole is heated to 40 to 50° C. During the condensation process the pH of the solution is kept at between 6 and 7 by the dropwise addition of 2 N sodium hydroxide solution. When condensation is finished the dyestuff is salted out with a mixture of sodium chloride and potassium chloride, isolated by filtration and dried. The dyestuff so obtained dyes cotton reddish yellow tints.

EXAMPLE 2

25.1 parts of the dyestuff of the formula

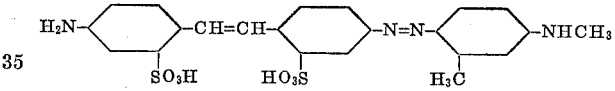

are suspended in 500 parts of water and the suspension so obtained is neutralized by the addition of sodium hydroxide. A solution of 18.5 parts of cyanuric chloride in 100 parts of acetone is added to the ice-cold solution so formed and the pH is kept at between 6 and 7 by the dropwise addition of 2 N sodium hydroxide solution. The dyestuff so obtained, which contains approximately 4 exchangeable chlorine atoms, dyes cotton reddish yellow tints.

EXAMPLE 3

30.2 parts of the dyestuff of the formula

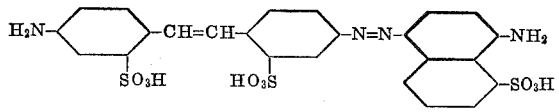

which can be prepared by coupling 4-nitro-4'-aminostilbene-2,2'-disulphonic acid with 1-naphthylamine-8-sulphonic acid and subsequent reduction of the nitro group to an amino group with the aid of sodium sulphide, are suspended in 500 parts of water and the suspension formed is neutralized by the addition of sodium hydroxide; 18.5 parts of cyanuric chloride in 100 parts of acetone are added to the solution so formed at room temperature. The pH of the solution is kept at between 6 and 7 during the condensation process by the dropwise addition of 2 N sodium hydroxide solution. When condensation is finished, 40 parts of ammonia (25% strength) are added to the solution and the whole is heated at about 40 to 45° C. for 3 hours. On cooling the reaction mixture, the precipitated dyestuff is isolated by filtration and dried. It dyes cotton reddish orange tints.

Dyestuffs which dye cotton orange tints are obtained by replacing the 1-naphthylamine-8-sulphonic acid used in the above example with 1-naphthylamine-6- or 7-sulphonic acid.

Dyeing prescription.—2 parts of the dyestuff obtained in the manner described in Example 1 and which, in the form of a free acid, corresponds to the formula

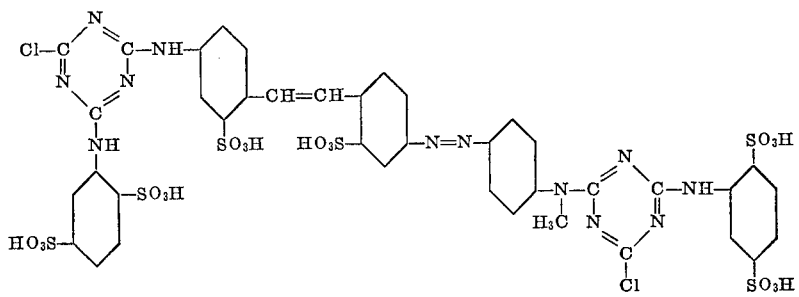

are dissolved in 100 parts of water.

The solution is added to 3,900 parts of cold water together with 40 parts of trisodium phosphate and 80 parts of sodium chloride, and 100 parts of a cotton fabric are entered into the dyebath so prepared.

The temperature is raised to 90° C. in the course of 45 minutes, and a further 80 parts of sodium chloride are added after 30 minutes; the temperature is kept at 90° C. for 30 minutes. The material is then rinsed, soaped for 15 minutes at the boil in a 0.3% solution of a non-ionic detergent, rinsed and dried.

A reddish yellow dyeing fast to washing and to light is obtained.

EXAMPLE 4

12.2 parts of the dyestuff of the formula

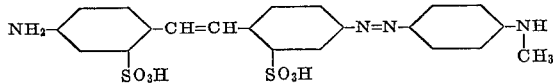

are suspended in 600 parts of water and the suspension formed is neutralized by the addition of sodium hydroxide. A solution of 5.5 parts of tetrachloropyrimidine in 300 parts of alcohol is added to the solution obtained and the reaction mixture is heated at 65° C. for 2 hours. In this process it is mainly the primary amino group that is substituted by the pyrimidine residue. On cooling the reaction mixture, the precipitated condensation product is isolated by filtration and washed with water.

The trichloropyrimidyl derivative so obtained is suspended in 500 parts of water and the suspension is neutralized with sodium hydroxide. A solution of the dichlorotriazine derivative, obtained in known manner from 4.65 parts of cyanuric chloride and 6.3 parts of aniline-2,5-disulphonic acid, is added to the neutral suspension. The reaction mixture is heated to 50° C. and the pH value is kept at between 6 and 7 by the dropwise addition of 1 N sodium hydroxide solution during the condensation process. When condensation is complete the dyestuff formed is salted out of the yellow solution by the addition of 20 percent by volume of sodium chloride, isolated by filtration and dried.

The dyestuff so obtained dyes cotton reddish yellow tints.

EXAMPLE 5

A solution of 37 parts of 4,4'-diaminostilbene-2,2'-disulphonic acid neutralized with sodium carbonate is added to an aqueous solution of the primary condensation product of 18.5 parts of cyanuric chloride and 25.3 parts of aniline-2,5-disulphonic acid. The reaction mixture is kept at 20 to 25° C. for 2 hours, the pH being maintained in the slightly acid to neutral range by the gradual addition of a dilute sodium hydroxide solution. The reaction mixture is then cooled to 10° C., acidified with 30 parts of 30% hydrochloric acid, whereupon diazotization is carried out with a solution of 6.5 parts of sodium nitrite. A solution of 10.7 parts of N-methylaniline in 100 parts of water containing 10 parts of 30% hydrochloric acid is added to the diazo compound. The pH value of the coupling mixture is adjusted to 3 to 4 by the addition of sodium acetate and the mixture is stirred until coupling is finished. The monoazo dyestuff formed is salted out, isolated by filtration and dissolved in 800 parts of water. A solution of the disodium salt obtained from 32 parts of 2,4 - dichloro-6-phenylamino-1,3,5-triazine-3'-sulphonic acid is added and the mixture is stirred for 6 to 10 hours at a temperature between 50 and 60° C. The reaction mixture is then cooled to room temperature and allowed to stand for 24 hours. The dyestuff that precipitates is isolated by filtration, washed with a 20% sodium chloride solution and dried. It dyes cotton pure, reddish yellow tints.

Further dyestuffs that are obtainable by the methods indicated in the foregoing by monoacylation or diacylation of the stilbene dyestuffs listed in Column I of the following table with the dichlorotriazine derivatives of the amines listed in Column II dye cotton the tints indicated in Column III.

TABLE

| | I | II | III |
|---|---|---|---|
| 1 | 4-(4''-N-methylaminophenylazo)-4'-aminostilbene-2,2'-disulphonic acid. | 1-aminobenzene-3-sulphonic acid | Reddish yellow. |
| 2 | do | 2-carboxy-1-aminobenzene-4-sulphonic acid | Do. |
| 3 | do | 1-methylaminobenzene-4-sulphonic acid | Do. |
| 4 | do | Aniline-ω-methanesulphonic acid | Do. |
| 5 | do | 3-aminobenzylsulphonic acid | Do. |
| 6 | do | Mixture of 1-aminobenzene-3-sulphonic acid with 1-aminobenzene-2,5-disulphonic acid. | Do. |
| 7 | do | 2-aminonaphthalene-4,8-disulphonic acid | Do. |
| 8 | do | 2-aminonaphthalene-4,6,8-trisulphonic acid | Do. |
| 9 | do | 1-aminonaphthalene-3,6-disulphonic acid | Do. |
| 10 | do | Aminomethane sulphonic acid | Do. |
| 11 | do | β-Sulphatoethylamine | Do. |
| 12 | 4-(4''-N-methylaminophenylazo)-4'-β-chloropropionylaminostilbene-2,2'-disulphonic acid. | 1-aminobenzene-2,5-disulphonic acid | Do. |
| 13 | 4-(4''-N-methylaminophenylazo)-4'-(2''',3''')-dichloroquinoxaline-6'''-carboylaminostilbene-2,2'-disulphonic acid. | do | Do. |
| 14 | 4-(4''-N-methylamino-2''-methylphenylazo)-4'-aminostilbene-2,2'-disulphonic acid. | 1-aminobenzene-3-sulphonic acid | Do. |
| 15 | do | 1-aminobenzene-2,5-disulphonic acid | Do. |
| 16 | 4-(4''-N-ethylaminophenylazo)-4'-aminostilbene-2,2'-disulphonic acid. | do | Do. |

TABLE—Continued

| | I | II | III |
|---|---|---|---|
| 17 | 4-(4''-N,β-hydroxyethylaminophenylazo)-4'-aminostilbene-2,2'-disulphonic acid. | ....do.... | Reddish yellow. |
| 18 | 4-(4''-aminophenylazo)-4'-aminostilbene-2,2'-disulphonic acid. | ....do.... | Do. |
| 19 | 4-(4''-amino-2''-methylphenylazo)-4'-aminostilbene-2,2'-disulphonic acid. | ....do.... | Do. |
| 20 | 4-(4''-amino-2'',5''-dimethylphenylazo)-4'-aminostilbene-2,2'-disulphonic acid. | ....do.... | Do. |
| 21 | 4-(4''-amino-2''-methyl-5''-methoxyphenylazo)-4'-aminostilbene-2,2'-disulphonic acid. | ....do.... | Reddish yellow to orange. |
| 22 | 4-(4''-amino-6''-sulphonaphthyl-(1'')-azo)-4'-aminostilbene-2,2'-disulphonic acid. | ....do.... | Reddish orange. |
| 23 | 4-(4''-amino-8''-sulphonaphthyl-(1'')-azo-4'-aminostilbene-2,2'-disulphonic acid. | 1-aminobenzene-3-sulphonic acid | Do. |
| 24 | 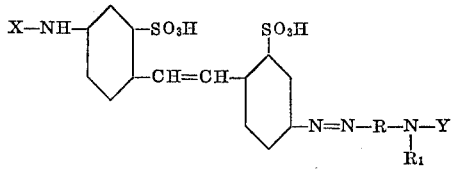 | ....do.... | Do. |
| 25 | 4-(4''-N-methylamino-2''-methylphenylazo)-4'aminostilbene-2,2'-disulphonic acid. | 1-aminobenzene-2,4-disulphonic acid | Do. |
| 26 | ....do.... | 2-carboxy-1-aminobenzene-4-sulphonic acid | Do. |

What is claimed is:
1. A monoazo dyestuff of the formula

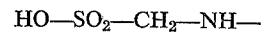

in which R represents a benzene radical which is free from sulfonic and carboxy groups or sulpho naphthyl and which is bound in 1,4-position, $R_1$ represents a low-molecular alkyl radical and X and Y each represents a 2-chloro-4-amino-1,3,5-triazine radical bound in 6-position, the 4-amino group in both radicals being a member selected from the group consisting of the sulfophenylamino, sulfonaphthylamino, sulfatoethylamino and

HO—SO$_2$—CH$_2$—NH— groups.

2. An azo dyestuff of the formula

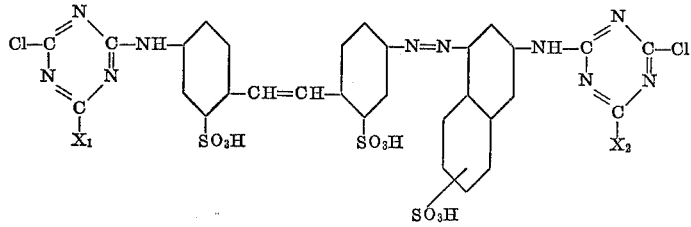

wherein $X_1$ and $X_2$ each represents a member selected from the group consisting of the sulfophenylamino and sulfonaphthylamino group.

3. The monoazo-dyestuff of the formula

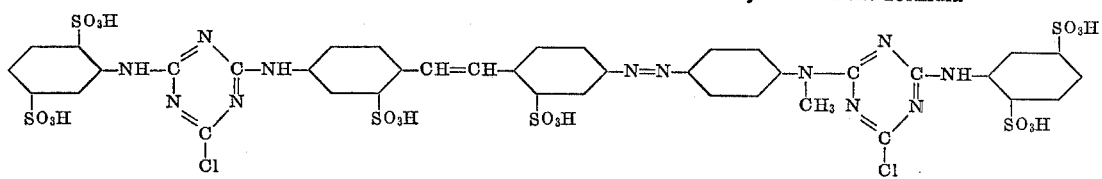

4. The monoazo-dyestuff of the formula

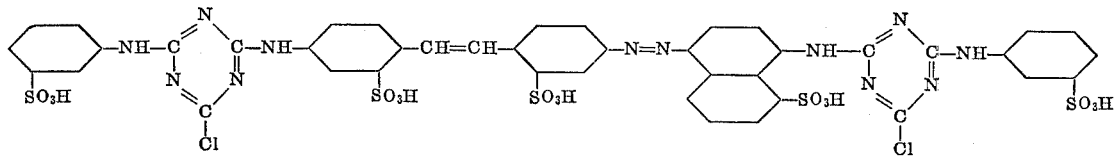

References Cited

UNITED STATES PATENTS 3,326,887   6/1967   Riat et al. _____ 260—153

CHARLES B. PARKER, *Primary Examiner.*

D. PAPUGA, *Assistant Examiner.*